US010431218B2

(12) United States Patent
Nelson

(10) Patent No.: US 10,431,218 B2
(45) Date of Patent: Oct. 1, 2019

(54) INTEGRATION AND PROBABILISTIC CONTROL OF ELECTRONIC DEVICES

(71) Applicant: EVA Automation, Inc., Menlo Park, CA (US)

(72) Inventor: Peter Nelson, San Jose, CA (US)

(73) Assignee: EVA Automation, Inc., Menlo Park, CA (US)

( * ) Notice: Subject to any disclaimer, the term of this patent is extended or adjusted under 35 U.S.C. 154(b) by 58 days.

(21) Appl. No.: 15/433,965

(22) Filed: Feb. 15, 2017

(65) Prior Publication Data

US 2017/0236514 A1    Aug. 17, 2017

Related U.S. Application Data

(60) Provisional application No. 62/295,443, filed on Feb. 15, 2016.

(51) Int. Cl.
| | |
|---|---|
| G10L 15/00 | (2013.01) |
| G10L 15/26 | (2006.01) |
| G10L 21/00 | (2013.01) |
| G10L 25/00 | (2013.01) |
| G10L 15/22 | (2006.01) |
| G10L 15/18 | (2013.01) |
| G06N 20/00 | (2019.01) |

(52) U.S. Cl.
CPC .............. *G10L 15/22* (2013.01); *G10L 15/18* (2013.01); *G10L 15/1815* (2013.01); *G06N 20/00* (2019.01); *G10L 2015/223* (2013.01); *G10L 2015/225* (2013.01)

(58) Field of Classification Search
CPC ......... G10L 15/22; G10L 15/30; G10L 15/16; G10L 15/18; G10L 21/00; G10L 2015/223
USPC ................................. 704/235, 241, 270–275
See application file for complete search history.

(56) References Cited

U.S. PATENT DOCUMENTS

| | | | | |
|---|---|---|---|---|
| 9,431,021 | B1 * | 8/2016 | Scalise | G10L 21/00 |
| 2003/0185358 | A1 * | 10/2003 | Sakamoto | G10L 15/26 |
| | | | | 379/102.01 |
| 2003/0187659 | A1 * | 10/2003 | Cho | H04L 12/2803 |
| | | | | 704/275 |
| 2005/0096753 | A1 * | 5/2005 | Arling | G05B 15/02 |
| | | | | 700/11 |
| 2008/0034081 | A1 * | 2/2008 | Marshall | G08C 17/02 |
| | | | | 709/223 |

(Continued)

*Primary Examiner* — Olujimi A Adesanya
(74) *Attorney, Agent, or Firm* — Steven Stupp

(57) ABSTRACT

A computer system may receive, from an acoustic transducer and/or a portable electronic device, information specifying one or more desired operations that are to be performed. This information may include natural language describing the one or more desired operations. In response, the computer system may transform the natural language into the one or more desired operations, and may identify a subset of the electronic devices based on the one or more desired operations and a predetermined supervised learning model that relates desired operations and the electronic devices. Next, the computer system may determine a set of commands based on the one or more desired operations and the subset of the electronic devices, and the computer system may provide the set of commands to the identified subset of the electronic devices, which may perform the one or more desired operations.

20 Claims, 7 Drawing Sheets

(56) References Cited

U.S. PATENT DOCUMENTS

| | | | |
|---|---|---|---|
| 2009/0222270 A2* | 9/2009 | Likens | G10L 15/26 704/275 |
| 2011/0075818 A1* | 3/2011 | Vance | G10L 15/07 379/88.01 |
| 2012/0052909 A1* | 3/2012 | Joh | G08C 17/02 455/557 |
| 2012/0059875 A1* | 3/2012 | Clark | G06F 3/0484 709/203 |
| 2012/0127072 A1* | 5/2012 | Kim | G10L 15/24 345/156 |
| 2012/0168240 A1* | 7/2012 | Wilson | A63H 30/04 180/167 |
| 2012/0274863 A1* | 11/2012 | Chardon | G06F 17/30011 348/734 |
| 2013/0073293 A1* | 3/2013 | Jang | G10L 15/22 704/275 |
| 2013/0088419 A1* | 4/2013 | Kim | G09G 5/00 345/156 |
| 2013/0169525 A1* | 7/2013 | Han | G10L 15/22 345/156 |
| 2013/0218572 A1* | 8/2013 | Cho | G06F 3/167 704/275 |
| 2013/0238326 A1* | 9/2013 | Kim | G06F 3/167 704/231 |
| 2014/0229184 A1* | 8/2014 | Shires | H04L 12/12 704/275 |
| 2014/0278435 A1* | 9/2014 | Ganong, III | G10L 15/22 704/275 |
| 2015/0006184 A1* | 1/2015 | Marti | G10L 25/63 704/275 |
| 2016/0075015 A1* | 3/2016 | Izhikevich | B25J 9/163 700/253 |
| 2016/0155443 A1* | 6/2016 | Khan | G06F 1/3203 704/275 |
| 2016/0179462 A1* | 6/2016 | Bjorkengren | G06F 3/167 704/275 |

* cited by examiner

INTEGRATION AND PROBABILISTIC CONTROL OF ELECTRONIC DEVICES

CROSS REFERENCE TO RELATED APPLICATIONS

This application claims priority under 35 U.S.C. 119(e) to U.S. Provisional Application Ser. No. 62/295,443, "Integration and Probabilistic Control of Electronic Devices," by Peter Nelson and Kevin Smith, filed on Feb. 15, 2016, the contents of which are herein incorporated by reference.

BACKGROUND

Field

The described embodiments relate to automation techniques, including automated integration and probabilistic control of a diverse set of electronic devices in an environment.

Related Art

Electronic devices have increasingly more powerful computing and communication capabilities, which allow users at arbitrary locations to interact with each other and to access vast amounts of information. The computing and communication capabilities have resulted in a large and growing set of applications that perform a variety of tasks, as well as a significant increase in mobile and online financial transactions. Consequently, electronic devices are increasingly popular. Indeed, in many environments (such as homes or offices) there are often multiple electronic devices.

In principle, the widely available electronic devices offer opportunities to collect and aggregate useful information from multiple different electronic devices, to perform complicated tasks using the capabilities of the different electronic devices and, more generally, to provide a wide variety of value-added services. These opportunities are expected to increase significantly as the computing and communication capabilities are included in replacements for legacy or 'background' electronic devices (such as refrigerators, utility equipment, furnaces, thermostats, smoke detectors, etc.) that are disseminated throughout people's homes and offices but that they currently interact with infrequently. Indeed, in the so-called 'Internet of Things,' it has been proposed that integrated networks of electronic devices can be used to further transform people's lives.

In practice, it has proven difficult to implement the Internet of Things and, thus, to achieve these ambitious goals. In particular, the electronic devices are usually from different manufacturers or providers and, because of their different functions, often have very different application programming interfaces and commands. Even though electronic devices typically include standardized network interfaces (such as a network interface that is compatible with an Institute of Electrical and Electronics Engineers (IEEE) 802.11 standard, Bluetooth® (from the Bluetooth Special Interest Group of Kirkland, Wash.), and/or another type of wireless network), the diversity of the electronic devices is often an obstacle to integrating the electronic devices into an interactive network.

Consequently, users are often forced to manually integrate electronic devices. However, even after electronic devices are integrated together, the different commands used by different electronic devices usually make it difficult for users to control the electronic devices. For example, in an interactive network with multiple electronic devices, a user could be forced to learn or keep track of multiple different user interfaces or commands. Therefore, existing approaches for integrating and controlling electronic devices can be time-consuming, expensive and frustrating for users, which degrades the user experience.

SUMMARY

The described embodiments include a computer system. This computer system includes an interface circuit that communicates via a network with an acoustic transducer in an environment, a portable electronic device, and electronic devices in the environment. Moreover, the computer system includes: a processor; memory that stores a program module that is executed by the processor to perform one or more desired operations. During operation, the computer system receives, from the acoustic transducer and/or the portable electronic device, information specifying the one or more desired operations that are to be performed. For example, the information may include natural language describing the one or more desired operations, which may have been provided by an individual. Then, the computer system transforms the natural language into the one or more desired operations. Furthermore, the computer system identifies a subset of the electronic devices based on the one or more desired operations and a predetermined supervised learning model that relates desired operations and the electronic devices, where the subset of the electronic devices is identified based on: at least a probability, calculated using the predetermined supervised learning model, which is associated with the subset of the electronic devices; and/or proximity of the subset of the electronic devices to the acoustic transducer. Additionally, the computer system determines a set of commands based on the one or more desired operations and the subset of the electronic devices, and the computer system provides the set of commands to the identified subset of the electronic devices, which may perform the one or more desired operations.

Note that the subset of the electronic devices may be identified based on: at least the probability, associated with the subset of the electronic devices and calculated using the predetermined supervised learning model, that exceeds a threshold value; and, when probabilities of the electronic devices calculated using the predetermined supervised learning model are less than the threshold value, proximity of the subset of the electronic devices to the acoustic transducer.

For example, the information may correspond to verbal information received by the acoustic transducer, which may have been spoken by the individual in the environment. Alternatively or additionally, the information may include text received from the portable electronic device.

Moreover, the transforming may involve performing semantic analysis on the information to determine an intent of the individual.

Furthermore, determining the set of commands may involve converting the one or more desired operations into a command terminology of one or more of the electronic devices.

In some embodiments, the computer system determines an order of the set of commands based on the subset of the electronic devices. For example, the subset of the electronic devices may include a power source and an electronic device that receives power from the power source, and a command that activates the power source may be performed before a remainder of the set of commands.

Moreover, the computer system may: add another electronic device to the electronic devices; determine one or more tags associated with the other electronic device, where the one or more tags include metadata for the other electronic device, a type of the other electronic device, and/or available commands for the other electronic device; and receive, from the portable electronic device, feedback, which may be provided by the individual (such as an action of the individual and/or a behavior of the individual).

Furthermore, the computer system may revise the supervised learning model based on the feedback. Note that adding the other electronic device and determining the one or more tags may occur automatically when the other electronic device is identified in the environment by the computer system based on communication via the network.

Additionally, the computer system may: present, to the portable electronic device, at least a command in the set of commands that is associated with the other electronic device prior to receiving the feedback; and conditionally modify the set of commands based on the feedback prior to providing the set of commands to the identified subset of the electronic devices. Note that the feedback may include: approval of the set of commands and/or modification of the set of commands.

In some embodiments, determining the one or more tags involves accessing predefined information associated with the other electronic device that is stored in the memory, including available commands associated with the other electronic device.

Moreover, the computer system may determine groupings of the electronic devices based on the one or more tags and/or may determine a hierarchy of the electronic devices based on the one or more tags.

Note that the set of commands may be determined based on available commands for the subset of the electronic devices. For example, the available commands for a given electronic device may include pairs of commands that result in opposite operations by the given electronic device.

Another embodiment provides a computer-program product for use with the computer system. This computer-program product includes instructions for at least some of the operations performed by the computer system.

Another embodiment provides a method for performing one or more desired operations. This method includes at least some of the operations performed by the computer system.

This Summary is provided merely for purposes of illustrating some exemplary embodiments, so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Figure 1:
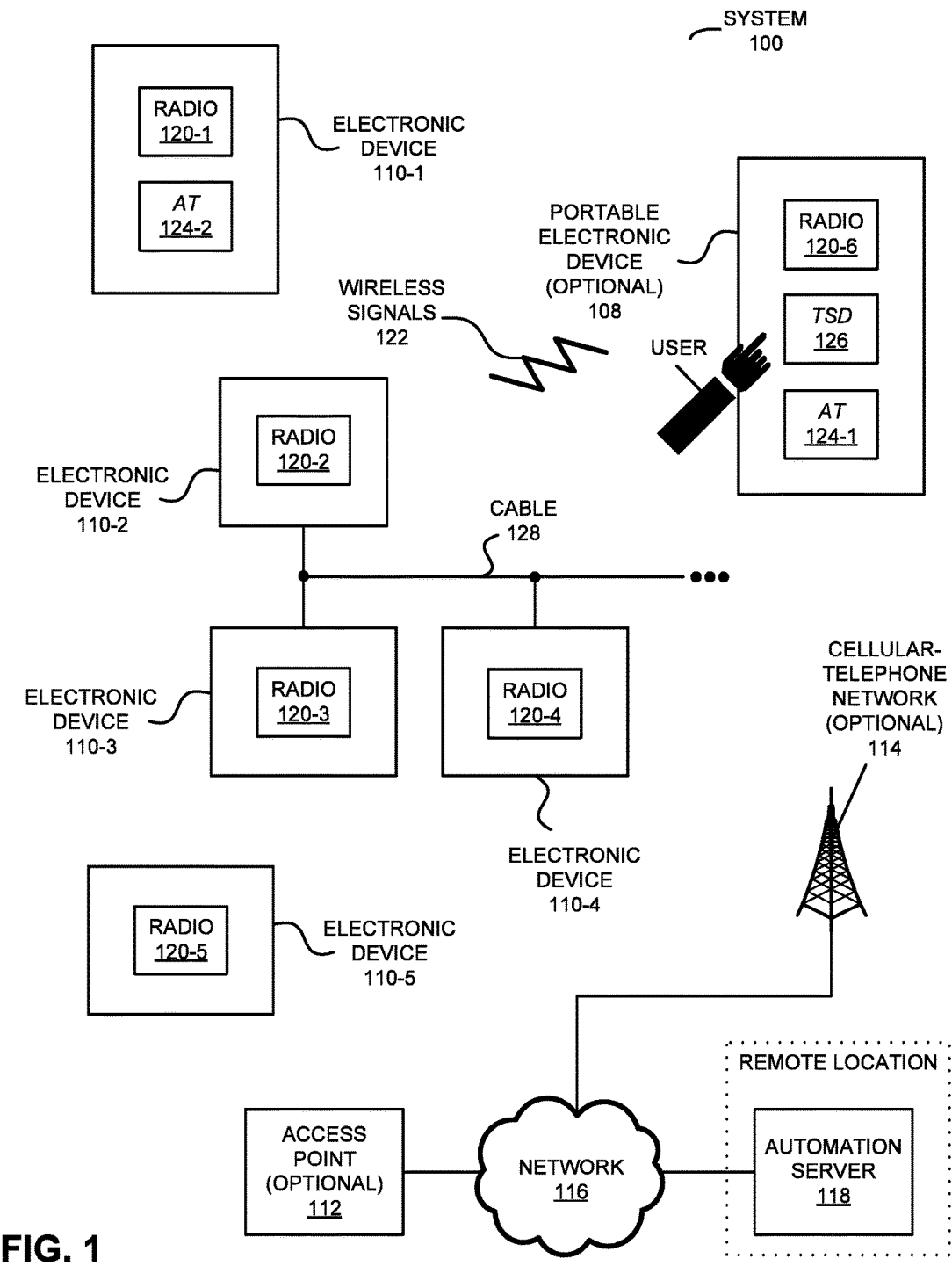
FIG. 1 is a block diagram illustrating a system with electronic devices wirelessly communicating in accordance with an embodiment of the present disclosure.

A computer system may receive, from an acoustic transducer and/or a portable electronic device, information specifying one or more desired operations that are to be performed. This information may include natural language describing the one or more desired operations. In response, the computer system may transform the natural language into the one or more desired operations, and may identify a subset of the electronic devices based on the one or more desired operations and a predetermined supervised learning model that relates desired operations and the electronic devices. For example, the subset of the electronic devices may be identified when at least a probability associated with the subset of the electronic devices and calculated using the predetermined supervised learning model exceeds a threshold value. Alternatively, when probabilities of the electronic devices calculated using the predetermined supervised learning model are less than the threshold value, the subset of the electronic devices may be identified based on proximity of the subset of the electronic devices to the acoustic transducer. Next, the computer system may determine a set of commands based on the one or more desired operations and the subset of the electronic devices, and the computer system may provide the set of commands to the identified subset of the electronic devices, which may perform the one or more desired operations.

By allowing users to specify the one or more desired operations using natural language, and then automatically translating the natural language into the one or more desired operations and intelligently identifying and controlling the subset of the electronic devices, this automation technique may significantly simplify the use of disparate electronic devices in an environment (such as a room, a building or a region). Therefore, the automation technique may enable a variety of complicated tasks (which may involve multiple electronic devices performing cooperative or interrelated operations) and value-added services. Moreover, by dynamically learning or adapting the aforementioned operations, the automation technique may provide continuous improvement in the accuracy of the operations and, thus, the complicated tasks and value-added services. Collectively, these capabilities may reduce or eliminate manual effort by the users, as well as the need for users to learn different user interfaces and commands associated with different electronic devices. Consequently, the automation technique may significantly improve the user experience.

In the discussion that follows the electronic devices may include radios that communicate packets or frames in accordance with one or more communication protocols, such as:

an Institute of Electrical and Electronics Engineers (IEEE) 802.11 standard (which is sometimes referred to as 'Wi-Fi®,' from the Wi-Fi® Alliance of Austin, Tex.), Bluetooth® (from the Bluetooth Special Interest Group of Kirkland, Wash.), a cellular-telephone communication protocol, a near-field-communication standard or specification (from the NFC Forum of Wakefield, Mass.), and/or another type of wireless interface. For example, the cellular-telephone communication protocol may include or may be compatible with: a $2^{nd}$ generation of mobile telecommunication technology, a $3^{rd}$ generation of mobile telecommunications technology (such as a communication protocol that complies with the International Mobile Telecommunications-2000 specifications by the International Telecommunication Union of Geneva, Switzerland), a $4^{th}$ generation of mobile telecommunications technology (such as a communication protocol that complies with the International Mobile Telecommunications Advanced specification by the International Telecommunication Union of Geneva, Switzerland), and/or another cellular-telephone communication technique. In some embodiments, the communication protocol includes Long Term Evolution or LTE. However, a wide variety of communication protocols may be used (such as Ethernet). In addition, the communication may occur via a wide variety of frequency bands. Note that one or more of the electronic devices may communicate using infra-red communication that is compatible with an infra-red communication standard (including unidirectional or bidirectional infra-red communication). In the discussion that follows, Wi-Fi is used as an illustrative example.

Communication among electronic devices is shown in FIG. 1, which presents a block diagram illustrating a system 100 with an optional portable electronic device 108, electronic devices 110, an optional access point 112, an optional cellular-telephone network 114, a network 116 (such as an intranet, the Internet and, more generally, a network that is, at least in part, wired), and a cloud-based automation server 118. For example, electronic devices 110 may include: a computing device, an entertainment device or a consumer-electronic device, an appliance, utility equipment, etc. Moreover, optional access point 112 may facilitate interconnection of a wireless local area network (WLAN) and network 116, and may include a physical access point or a virtual access point.

In particular, optional portable electronic device 108, electronic devices 110 and optional access point 112 may communicate with each other using wireless communication, and optional access point 112 may communicate with cloud-based automation server 118 via network 116. Alternatively or additionally, at least one of optional portable electronic device 108 and electronic devices 110 may communicate with cloud-based automation server 118 via optional cellular-telephone network 114 and/or network 116. During the wireless communication, these electronic devices may wirelessly communicate while: transmitting advertising frames on wireless channels, detecting one another by scanning wireless channels, establishing connections (for example, by transmitting association requests), and/or transmitting and receiving packets or frames (which may include the association requests and/or additional information as payloads, such as information specifying commands, data, etc.).

Figure 6:
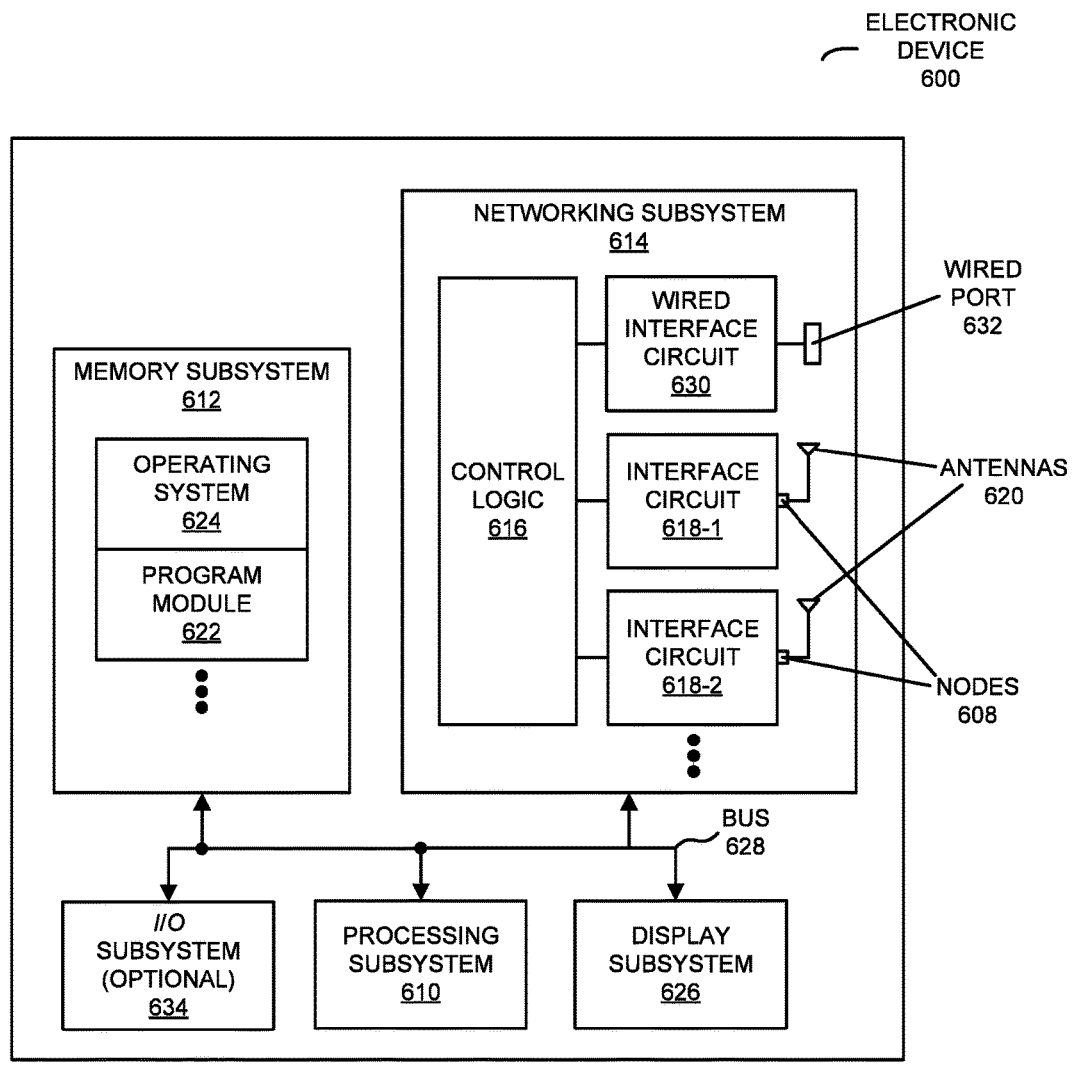
FIG. 6 is a block diagram illustrating one of the electronic devices of FIG. 1 in accordance with an embodiment of the present disclosure.

As described further below with reference to FIG. 6, optional portable electronic device 108, electronic devices 110, optional access point 112, and/or automation server 118 may include subsystems, such as: a networking subsystem, a memory subsystem and a processor subsystem. In addition, optional portable electronic device 108, electronic devices 110, optional access point 112, and/or automation server 118 may include radios 120 in the networking subsystems. Note that radios 120 may be instances of the same radio or may be different from each other. More generally, optional portable electronic device 108, electronic devices 110, optional access point 112, and/or automation server 118 can include (or can be included within) any electronic devices with the networking subsystems that enable optional portable electronic device 108, electronic devices 110, optional access point 112, and/or automation server 118 to wirelessly communicate with each other. This wireless communication can comprise transmitting advertisements on wireless channels to enable electronic devices to make initial contact or detect each other, followed by exchanging subsequent data/management frames (such as association requests and responses) to establish a connection, configure security options (e.g., Internet Protocol Security), transmit and receive packets or frames via the connection, etc.

As can be seen in FIG. 1, wireless signals 122 (represented by a jagged line) are transmitted from radio 120-6 in optional portable electronic device 108. These wireless signals are received by: at least one of electronic devices 110, optional access point 112 and/or optional cellular-telephone network 114. In particular, optional portable electronic device 108 may transmit packets. In turn, these packets may be received, e.g., by a radio 120-2 in electronic device 110-2. This may allow optional portable electronic device 108 to communicate information to electronic device 110-2. While FIG. 1 illustrates optional portable electronic device 108 transmitting packets, note that optional portable electronic device 108 may also receive packets from electronic device 110-2 and/or one or more other components in system 100. More generally, wireless signals may be transmitted and/or received by one or more of the components in system 100.

In the described embodiments, processing of a packet or frame in optional portable electronic device 108, electronic devices 110, optional access point 112, optional cellular-telephone network 114, and/or cloud-based automation server 118 includes: receiving wireless signals 122 with the packet or frame; decoding/extracting the packet or frame from received wireless signals 122 to acquire the packet or frame; and processing the packet or frame to determine information contained in the packet or frame (such as the information associated with a data stream). For example, the information from optional portable electronic device 108 may include information specifying one or more desired operations that are to be performed by at least a subset of electronic devices 110 (i.e., one or more of electronic devices 110). This information may correspond to spoken or verbal instructions from a user acquired by one or more acoustic transducers (AT) 124 (such as a microphone or an acoustic sensor) in or electrically coupled to optional portable electronic device 108 and/or one or more of electronic devices 110. Alternatively or additionally, a user may provide the information by using or interacting with a user interface displayed on a touch-sensitive display (TSD) 126 in optional portable electronic device 108, e.g., by activating one or more virtual icons by making and then breaking contact with a surface of touch-sensitive display 126 using one or more fingers or digits, or using a stylus. In some embodiments, instead of or in additional to touch-sensitive display 126, optional portable electronic device 108 includes a user interface with physical knobs and/or buttons, such as a keyboard, that a user can use to provide the information. While the preceding discussion uses wireless communication between components in system 100 as an illustration, in some embodiments at least some of the components communicate via wired communication (e.g., via cable 128).

Note that the communication between optional portable electronic device 108, one or more of electronic devices 110, optional access point 112, optional cellular-telephone network 114, and/or cloud-based automation server 118 may be characterized by a variety of performance metrics, such as: a received signal strength indicator (RSSI), a data rate, a data rate for successful communication (which is sometimes referred to as a 'throughput'), an error rate (such as a packet error rate, or a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a channel or link), and/or a ratio of an actual data rate to an estimated data rate (which is sometimes referred to as 'utilization').

As discussed previously, it can be difficult to integrate electronic devices 110 into an interactive network (e.g., system 100) and then to control electronic devices 110 to perform desired operations. In particular, electronic devices 110 may be from different manufacturers or providers, and they may have different application programming interfaces and commands. These challenges can be addressed by the automation technique.

During the automation technique, a user may control subset of electronic devices 110 (which may be unknown, a priori, to the user) to perform a desired task or achieve a goal (either of which may involve one or more desired operations that may also be unknown, a priori, to the user) by providing information that specifies (directly or indirectly) the one or more desired operations. Moreover, the user may provide the information using 'natural language,' which should be understood to be a human language (such as a written language and/or a spoken language), as opposed to a constructed language, an artificial machine language, an artificial command language or an artificial programming language of one or more of electronic devices 110 (which are sometimes referred to as an 'artificial language'). Thus, the user can communicate their intentions (i.e., the desired task) in their own words or language (such as using colloquial English, instead of being forced to learn and use an artificial language associated with one or more of electronic devices 110. For example, the user may verbally state or speak the desired task and/or may enter the desired task as text using a user interface in optional portable electronic device 108.

This information may be picked up by one or more of acoustic transducers 124 or may be received by optional portable electronic device 108. Then, via optional access point 112, optional cellular-telephone network 114, and/or network 116, the information may be provided to automation server 118. In some embodiments, location information may be included with acoustic signals detected by a given acoustic transducer so that the acoustic signals can be associated with a particular location or region in an environment (such as a room, a building or a region or geographic area), as well as the proximate or nearby electronic devices (such as electronic devices within 1-5 m).

After receiving the information, automation server 118 may transforms the natural language into the one or more desired operations. For example, automation server 118 may use speech recognition to convert the information into text (or alphanumeric characters) and sematic analysis to determine the user's intent and, thus, to convert the natural language into the one or more desired operations (or the most likely one or more desired operations). Based on the one or more desired operations and a predetermined supervised learning model that relates desired operations and electronic devices 110, automation server 118 may identify a subset of electronic devices 110 (which may include one or more of electronic devices 110). In particular, the one or more desired operations may be an input to the predetermined supervised learning model, which provides a probability associated with the subset of electronic devices 110 as an output or probabilities associated with each of electronic devices 110 as outputs. If at least the probability associated with the subset of electronic devices 110 or the probabilities associated with the electronic devices in the subset exceeds a threshold value (such as 70, 80, 90, 95 or 99%), then automation server 118 may identify these electronic devices as the subset. Thus, the subset of electronic device 110 may be identified using a fuzzy map relating electronic devices 110 and the one or more desired operations.

Alternatively, when probabilities of electronic devices 110 calculated using the predetermined supervised learning model are less than or equal to the threshold value, the subset of electronic devices 110 may be those electronic devices that are proximate to at least one of acoustic transducers 124 (such as one or more electronic devices within 1-5 m of at least one of acoustic transducers 124 that detected acoustic signals that included the information).

Next, automation server 118 may determine a set of commands (which may include one or more commands) based on the one or more desired operations and the subset of electronic devices 110. For example, the one or more desired operations and the subset of electronic devices 110 may be converted into the set of commands based on available commands for subset of electronic devices 110. Thus, determining the set of commands may involve converting the one or more desired operations into a command terminology one or more of electronic devices 110. Note that the available commands for a given electronic device may include pairs of commands that result in opposite operations by the given electronic device (such as power on and power off, a higher temperature set point and a lower temperature set point, an increased volume and a decreased volume, etc.).

Furthermore, automation server 118 may provide commands in the set of commands to electronic devices in the subset of electronic devices 110 via network 116, optional cellular-telephone network 114, and/or optional access point 112, so the subset of electronic devices 110 can perform the one or more desired operations. In particular, the subset of electronic devices 110 may automatically perform the one or more desired operations without further intervention or action by the user.

In some embodiments, the set of commands are ordered so that they can be performed in appropriate sequence by the subset of electronic device 110. Thus, automation server 118 may determine an order of the set of commands based on the subset of electronic devices 110 (such as based on predefined information that specifies hierarchical arrangement(s) of electronic devices 110, which may be stored in memory). For example, the subset of electronic devices 110 may include a power source and an electronic device that receives power from the power source, and a command that activates the power source may be performed before a remainder of the set of commands.

The automation technique may also allow a new electronic device (such as electronic device 110-5) to be added to and seamless integrated into system 100 with reduced or minimal manual effort by the user (and, ideally, no manual effort or user action). For example, when electronic device 110-5 is detected, such as, based on a broadcast beacon that includes an identifier of electronic device 110-5 (e.g., a media access control address), automation server 118 may added electronic device 110-5 to electronic devices 110. Then, automation server 118 may determine one or more tags (or descriptor elements) associated with electronic device 110-5. The one or more tags may include: metadata for electronic device 110-5, a type of electronic device 110-5, and/or available commands for electronic device 110-5. In particular, automation server 118 may access (locally and/or remotely) predefined information about or associated with electronic device 110-5 that is stored in memory based on the identifier, including available commands associated with electronic device 110-5. Alternatively or additionally, at least some of the information included in the one or more tags may be provided by electronic device 110-5. Note that adding electronic device 110-5 and determining the one or more tags may occur automatically when electronic device 110-5 is identified in the environment by automation server 118 based on communication with electronic device 110-5.

In some embodiments, automation server 118 determines groupings of electronic devices 110 (including electronic device 110-5) based on the one or more tags and/or may determine a hierarchy of electronic devices 110 (including electronic device 110-5) based on the one or more tags. For example, electronic device 110-5 may receive power, along with several of electronic devices 110, from a proximate power supply. Consequently, the one or more tags for electronic device 110-5 may be group it these other electronic devices, and the one or more tags for electronic device 110-5 may specify it as hierarchically dependent on the power supply (e.g., the power supply may be in a first hierarchical level and electronic device 110-5 may be in a second, dependent hierarchical level).

Next, automation server 118 may provide, via network 116, optional cellular-telephone network 114, and/or optional access point 112, content in or associated with the one or more tags to the user (e.g., the content may be displayed on touch-sensitive display 126 in a user interface), and the user may interact with the user interface (such as by activating one or more virtual icons and, more generally, based on the user's actions and/or behavior) to provide, via optional access point 112, optional cellular-telephone network 114 and/or network 116, feedback about the content (and, thus, the one or more tags) to automation server 118. Note that the feedback may include: approval of the content and/or modification of the content.

After receiving the feedback, automation server 118 may revise the supervised learning model based on the feedback. For example, automation server 118 may retrain the supervised learning model based on a training dataset that includes the feedback.

In some embodiments, at least one of the commands in the set of commands for the one or more desired operations is associated with electronic device 110-5. In these embodiments, the content provided to optional portable electronic device 108 includes at least the one of the commands. Note that the feedback may include: approval of the set of commands and/or modification of the set of commands. Moreover, automation server 118 may conditionally modify the set of commands based on the feedback prior to providing the set of commands to the identified subset of electronic devices 110.

This approach may allow the use to integrate and control electronic devices 110 from multiple manufacturers in a highly automated way, and to flexibly or dynamically adapt to changes in electronic devices 110 and/or their functionality (as well as the associated commands). Consequently, the automation technique can reduce the time and effort needed to set up and use electronic devices 110 to perform desired tasks, allows users to use electronic devices 110 in an intuitive manner and, thus, can reduce user frustration and improve user satisfaction when using electronic devices 110.

Although we describe the network environment shown in FIG. 1 as an example, in alternative embodiments, different numbers or types of electronic devices may be present. For example, some embodiments include more or fewer electronic devices. As another example, in another embodiment, different electronic devices are transmitting and/or receiving packets or frames. While optional portable electronic device 108, electronic devices 110 and optional access point 112 are illustrated with a single instance of radios 120, in other embodiments optional portable electronic device 108, electronic devices 110 and optional access point 112 (and optionally automation server 118) may include multiple radios.

Figure 2:
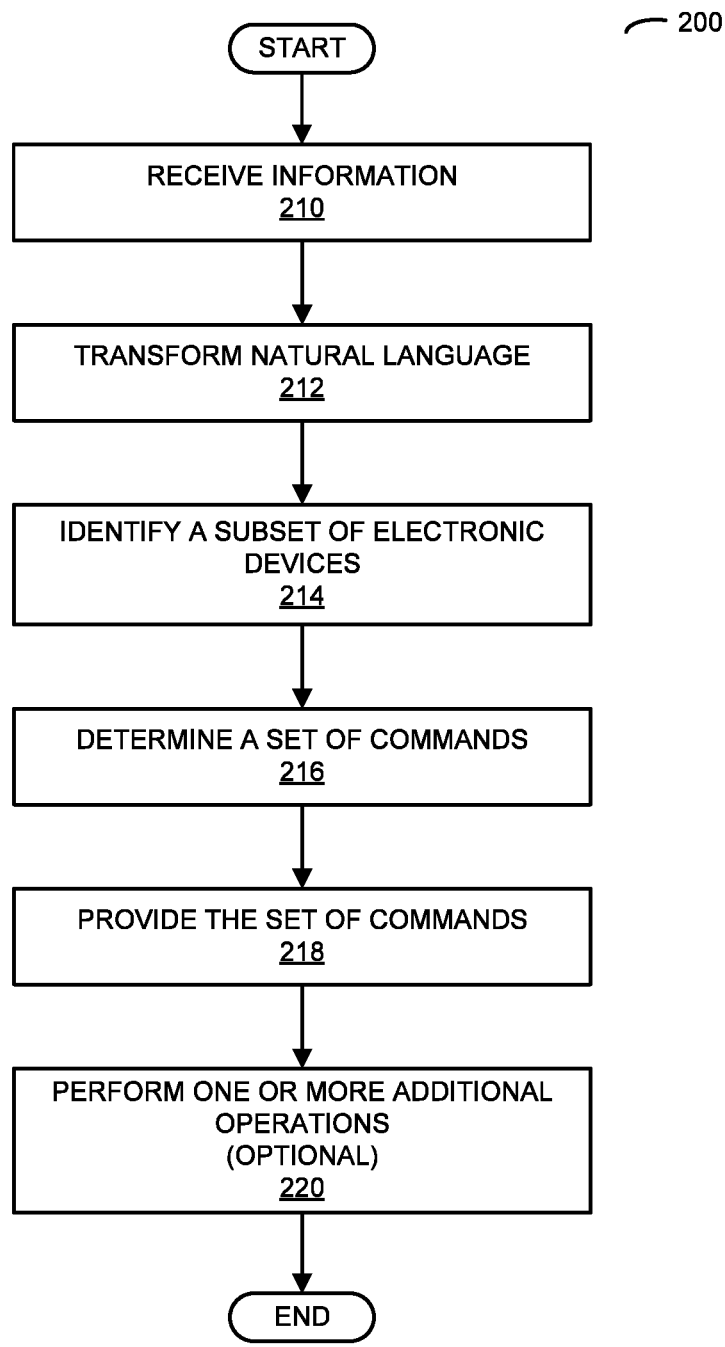
FIG. 2 is a flow diagram illustrating a method for performing one or more desired operations in accordance with an embodiment of the present disclosure.

We now describe embodiments of the automation technique. FIG. 2 presents a flow diagram illustrating a method 200 for performing one or more desired operations, which may be performed by a computer system, such as automation server 118 (FIG. 1). During operation, the computer system (such as a control mechanism, a control circuit or control logic, e.g., a processor executing a program module and/or or a circuit) receives, from an acoustic transducer in an environment and/or a portable electronic device, information (operation 210) specifying the one or more desired operations that are to be performed. For example, the information may include natural language (such as verbal information received by the acoustic transducer and/or text received from the portable electronic device) describing the one or more desired operations, which may have been provided by an individual.

Then, the computer system transforms the natural language (operation 212) into the one or more desired operations. For example, the computer system may perform speech recognition and semantic analysis on the information to determine an intent of the individual.

Furthermore, the computer system identifies a subset of electronic devices (operation 214) based on the one or more desired operations and a predetermined supervised learning model that relates desired operations and the electronic devices. Note that the subset of the electronic devices may be identified based on: at least a probability, associated with the subset of the electronic devices and calculated using the predetermined supervised learning model, that exceeds a threshold value; and, when probabilities of the electronic devices calculated using the predetermined supervised learning model are less than the threshold value, proximity of the subset of the electronic devices to the acoustic transducer (and, more generally, a location of the portable electronic device and/or the user, which may be determined using a local positioning system, a wireless network, a cellular-telephone network and/or a global positioning system).

Additionally, the computer system determines a set of commands (operation 216) based on the one or more desired operations and the subset of the electronic devices, and the computer system provides the set of commands (operation 218) to the identified subset of the electronic devices, which may perform the one or more desired operations. Note that determining the set of commands (operation 216) may involve converting the one or more desired operations into a command terminology of one or more of the electronic devices, such as available commands for the subset of the electronic devices. Note that the available commands for a given electronic device may include pairs of commands that result in opposite operations by the given electronic device.

In some embodiments, the computer system optionally performs one or more additional operations (operation 220). In particular, the computer system may determine an order of the set of commands based on the subset of the electronic devices. Alternatively or additionally, the computer system may: add another electronic device to the electronic devices; determine one or more tags associated with the other electronic device, where the one or more tags include metadata for the other electronic device, a type of the other electronic device, and/or available commands for the other electronic device; and receive, from the portable electronic device, feedback (which may be from the individual, such as an action of the individual and/or a behavior of the individual). For example, determining the one or more tags may involves accessing predefined information associated with the other electronic device that is stored in memory, including available commands associated with the other electronic device. Furthermore, the computer system may determine groupings of the electronic devices based on the one or more tags and/or may determine a hierarchy of the electronic devices based on the one or more tags.

In some embodiments, the computer system: presents, to the portable electronic device, at least a command in the set of commands that is associated with the other electronic device prior to receiving the feedback (e.g., from the individual using the portable electronic device); and conditionally modifies the set of commands based on the feedback prior to providing the set of commands to the identified subset of the electronic devices. Note that the feedback may include: approval of the set of commands and/or modification of the set of commands.

Furthermore, the computer system may revise the supervised learning model based on the feedback. Note that adding the other electronic device and determining the one or more tags may occur automatically when the other electronic device is identified in the environment by the computer system based on communication via the network.

Figure 3A:
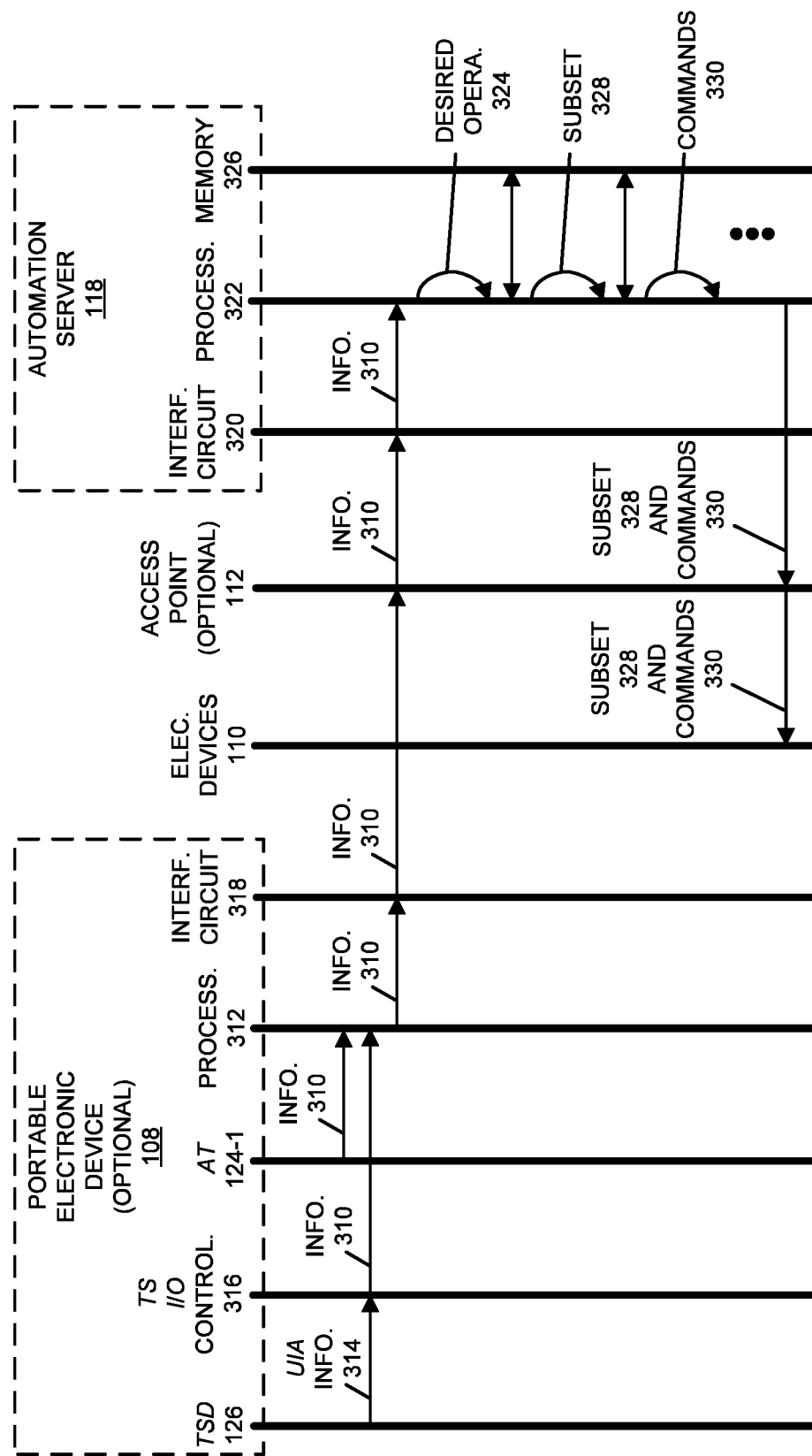
FIG. 3A is a drawing illustrating communication among the electronic devices in FIG. 1 in accordance with an embodiment of the present disclosure.

FIG. 3A presents a drawing illustrating communication among optional portable electronic device 108, electronic devices 110, optional access point 112 and automation server 118. In particular, a user in an environment may verbally provide information (info.) 310, specifying one or more desired operations that are to be performed, which may be measured or acquired by acoustic transducer 124-1 in optional portable electronic device 108. Alternatively or additionally, information 310 may be measured or acquired by at least another of acoustic transducers 124 in the environment. Then, acoustic transducer 124-1 may provide information 310 to processor 312.

In some embodiments, the user provides information 310 using a user interface displayed on touch-sensitive display 126 in optional portable electronic device 108. Next, touch-sensitive display 126 may provide user-interface activity (UIA) information 314 (which corresponds to information 310) to touch-sensitive (TS) input/output (I/O) controller 316, which may provide information 310 to processor 312.

Moreover, processor 312 may provide information 310 to interface circuit 318, which may provide information 310 to cloud-based automation server 118 via optional access point 112 (and/or optional cellular-telephone network 114). After interface circuit 320 receives information 310, interface circuit 320 may provide information 310 to processor 322. Then, processor 322 may transform the natural language in information 310 into one or more desired operations 324. Furthermore, processor 322 may identify a subset 328 of electronic devices 110 based on the one or more desired operations 324, a predetermined supervised learning model that relates desired operations and the electronic devices, and/or a location of acoustic transducer 124-1, optional portable electronic device 108 or the user. For example, subset 328 of electronic devices 110 may be identified based on one or more probabilities for electronic devices 110 calculated using the predetermined supervised learning model and a threshold value and/or subset 328 of electronic devices 110 may be identified based on predetermined locations of electronic devices 110 relative to the location of acoustic transducer 124-1 (which may be included with information 310 from acoustic transducer 124-1), optional portable electronic device 108 or the user (such as electronic devices within 1-5 m). Note that the predetermined supervised learning model and the predetermined locations of electronic devices 110 may be stored (locally and/or remotely) in memory 326, which is access by processor 322.

Additionally, processor 322 may determines a set of commands 330 based on the one or more desired operations 324 and subset 328 of electronic devices 110. For example, processor 322 may convert or map the one or more desired operations 324 to the set of commands 330 based on a command terminology of one or more of electronic devices 110, such as available commands for subset 328 of electronic devices 110, which are stored (remotely and/or locally) in memory 236 and which are accessed by processor 322.

Moreover, processor 322 may provide the set of commands 330 and the identified subset 328 of electronic devices 110 to interface circuit 320, which may provide the set of commands 330 to the identified subset 328 of electronic devices 110 via optional access point 112 (and/or optional cellular-telephone network 114). In particular, the set of commands 330 may be included in unicast messages to the identified subset 328 of electronic devices 110 and/or in broadcast messages to electronic devices 110 that specify the identified subset 328 of electronic devices 110. After receiving the set of commands 330, the subset 328 of electronic devices 110 may perform the one or more desired operations 324 (e.g., automatically, i.e., without further user action).

In some embodiments, automation server 118 performs one or more optional additional operations, which may be performed before or after the set of commands 330 are provided to the identified subset 328 of electronic devices 110. For example, processor 322 may determine an order of the set of commands 330 based on subset 328 of electronic devices 110. In particular, processor 322 may access information specifying a hierarchical arrangement of electronic devices 110, which may be stored (locally and/or remotely) in memory 326.

Figure 3B:
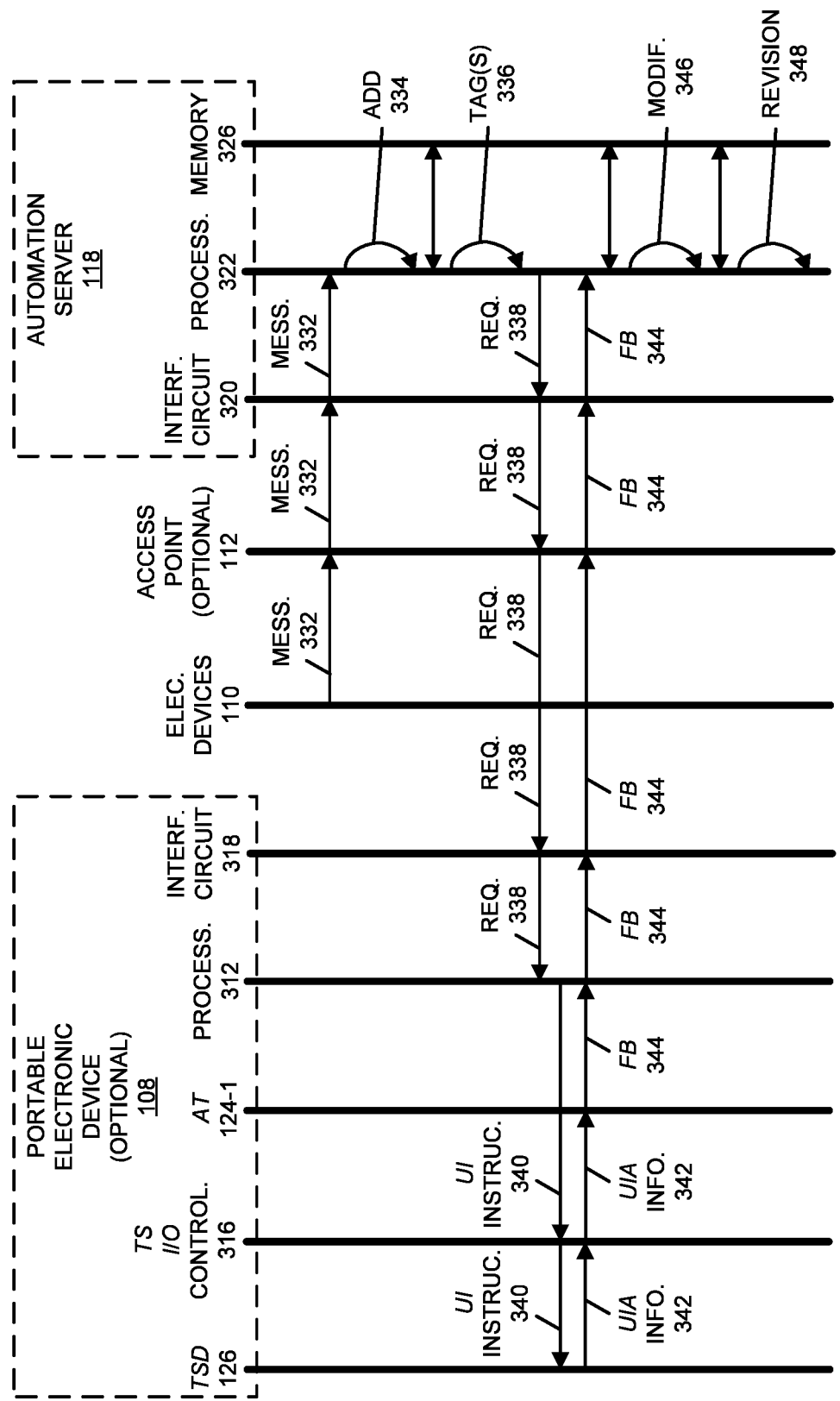
FIG. 3B is a drawing illustrating communication among the electronic devices in FIG. 1 in accordance with an embodiment of the present disclosure.

Moreover, automation server 118 may automatically (i.e., without user action) or semi-automatically (i.e., with limited user action) integrate a new electronic device in electronic devices 110. This is shown in FIG. 3B, which presents a drawing illustrating communication among optional portable electronic device 108, electronic devices 110, optional access point 112 and automation server 118. In particular, a message 332 (such as a beacon) may be communicated from the new electronic device in electronic devices 110 to optional access point 112 (and/or optional cellular-telephone network 114) and then to automation server 118.

After receiving message 332, interface circuit 320 may provide information in message 332 (such as an identifier of the new electronic device) to processor 322. In response, processor may: update or add 334 the new electronic device to electronic devices 110; and determine one or more tags 336 associated with the new electronic device. The one or more tags 336 may include metadata for the other electronic device, a type of the other electronic device, and/or available commands for the other electronic device. For example, the identifier in message 332 may allow processor 322 to access stored information about the new electronic device, which are stored (remotely and/or locally) in memory 326, and then to determine or create the one or more tags 336. Furthermore, processor 322 may determine groupings of electronic devices 110 based on the one or more tags 336 (e.g., based on similar or related functionality and/or proximate locations specified in the metadata) and/or may determine a hierarchy of electronic devices 110 based on the one or more tags 336 (e.g., based on interrelationships specified in the metadata, such as a power supply and a daughter electronic device or a sensor that provides feedback to another electronic device).

Next, processor 322 may provide a request 338 for feedback on the one or more tags 336 and/or the set of commands 330 to interface circuit 320, which may provide request 338 to portable electronic device 108 via optional access point 112 (and/or optional cellular-telephone network 114). After receiving request 338, interface circuit 318 may provide request 338 to processor 312. In turn, processor 312 may provide user-interface (UI) instructions 340 based on request 338 to touch-sensitive input/output controller 316, which may provide user-interface instructions 340 to touch-sensitive display 126 so that a corresponding user interface is displayed on touch-sensitive display 126 (e.g., automatically in response to request 338). Note that the user interface may request user feedback on the one or more tags 336 and/or the set of commands 330, such as one or more virtual icons and associated text that allow the user to indicate approval, disapproval and/or a modification of at least one of the one or more tags 336 and/or at least one of the set of commands 330.

Based on the user's interaction with the user interface (such as by activating one or more virtual icons), touch-sensitive display 126 may provide user-interface activity information 342 to touch-sensitive input/output controller 316, which may provide user-interface activity information 342 to processor 322. Then, based on user-interface activity information 342, processor 322 may provide feedback (FB) 344 to interface circuit 318, which may provide feedback 344 to automation server 118 via optional access point 112 (and/or optional cellular-telephone network 114).

After receiving feedback 344, interface circuit 320 may provide feedback 344 to processor 322. Based on feedback 344, processor may modify 346 at least one of the one or more tags 336 and/or at least one of the set of commands 330. Note that modification 346 may be conditional, such as when feedback 344 indicates something is incorrect or a change is needed, or when feedback 344 is consistent with a history of prior feedback or commands stored (locally and/or remotely) in memory 326, which may be accessed by processor 322. Moreover, modification 346 may be performed before or after the set of commands 330 are provided to the subset 328 of electronic devices 110.

Furthermore, based on feedback 344, processor 322 may revise 348 the supervised learning model. For example, feedback 344 may be used to revise a dataset that is used to train the supervised learning model. The revised supervised learning model may be stored (locally and/or remotely) in memory 326, which may be accessed by processor 322.

In some embodiments of method 200 (FIG. 2) there are additional or fewer operations. Moreover, the order of the operations may be changed, and/or two or more operations may be combined into a single operation. Furthermore, one or more operations may be modified.

Figure 4:
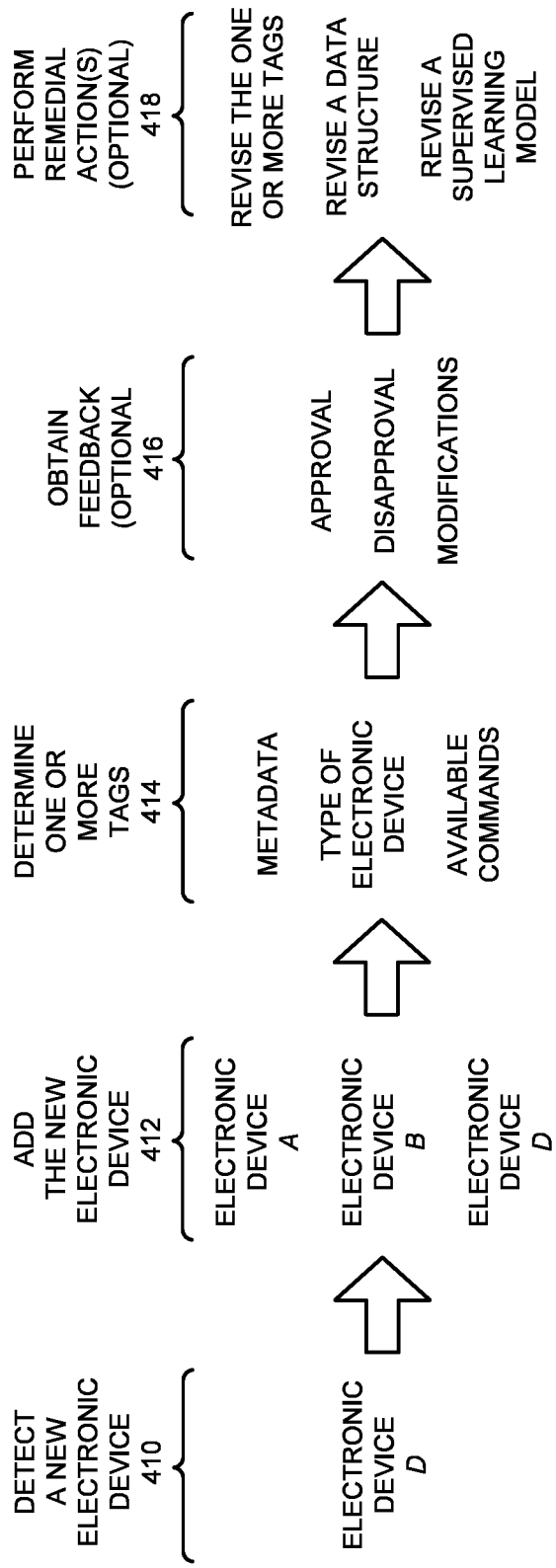
FIG. 4 is a drawing illustrating integration of an electronic device in a system in accordance with an embodiment of the present disclosure.

In an exemplary embodiment, the automation technique allows a user to integrate disparate electronic devices from different manufacturers into an interactive network. This is shown in FIG. 4, which presents a drawing illustrating integration of an electronic device in a system. In particular, when a new electronic device (such as electronic device D) is detected (operation 410) in an environment (such as based on wireless communication), the automation server may add (operation 412) the new electronic device to the electronic devices. Moreover, the automation server may determine one or more tags (operation 414) associated with the new electronic device. For example, the automation server may access one or more data structures with (locally and/or remotely) predefined information about the new electronic device that is stored in memory based on an identifier of the new electronic device, which was included in a packet received from the new electronic device. Note that the one or more tags may include: metadata for the new electronic device (such as a location of the new electronic device in the environment, which may have been included in the packet or which may be indirectly determined based on the communication, e.g., the variation in RSSI with distance), a type of the new electronic device, and/or available commands for the new electronic device. In some embodiments, the available commands of a given electronic device in the one or more tags include pairs of commands that result in opposite operations by the given electronic device, such as: 'turn on' and 'turn off', 'brighter' and 'darker', different color pairs, etc.

Moreover, at least one of the tags may be inferred based on similarity to another of the electronic devices. For example, the automation server may infer at least the one of the tags using a setup supervised learning model. This setup supervised-learning model may include at least one of: a classification and regression tree, a support vector machine, a neural network, logistic regression, linear regression, LASSO, and/or another (linear or nonlinear) supervised-learning technique.

Furthermore, the automation server may optionally obtain (e.g., by requesting and then receiving) feedback (operation 416) from a user about the one or more tags. For example, the feedback may include at least one of: approval of the one or more tags, disapproval or rejection of at least one of the one or more tags, or a modification of at least one of the one or more tags. In some embodiments, the feedback is used to perform one or more optional remedial actions (operation 418), such as revising or updating the one or more tags, the one or more data structures and/or the setup supervised learning model that were used to determine the one or more tags, so that the setup operations are more accurate in the future.

Additionally, during this setup process, the automation server may determine groupings of the electronic devices based on the tags, such as similar or related electronic devices (e.g., electronic devices in an entertainment system and/or electronic devices that are proximate to each other, such as within 1-5 m of each other). Furthermore, the automation server may determine a hierarchy of the electronic devices based on the tags. For example, the automation server may determine that the new electronic device receives power from a power supply.

Thus, the automation technique may reduce or eliminate the effort needed to setup or add a new electronic device to the system. For example, the one or more tags may be auto-populated based on a type or a classification of the new electronic device (such as a light).

Figure 5:
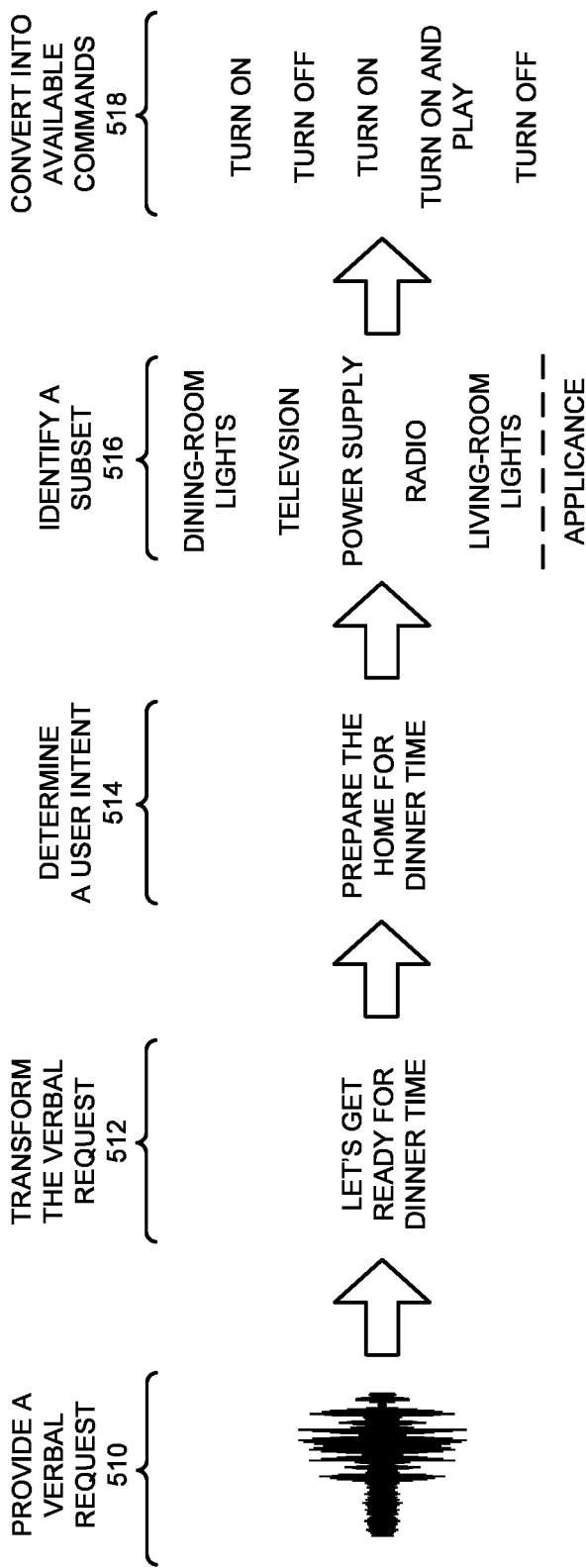
FIG. 5 is a drawing illustrating probabilistic control of a subset of electronic devices in a system in accordance with an embodiment of the present disclosure.

The automation technique may also allow the user to control the electronic devices to perform particular tasks or to achieve particular goals using natural language. This is shown in FIG. 5, which presents a drawing illustrating probabilistic control of a subset of electronic devices in a system. In particular, the user may provide a verbal request (operation 510), such as by simply stating, in their own words and normal lexicography (as opposed to an artificial language or commands associated with one or more of the electronic devices) something that they would like to have happen, such as 'let's get ready for dinner time'. For the user, saying 'let's get ready for dinner time' may, indirectly, refer to multiple desired operations, including: turning off particular electronic devices (such as the television), turning on a radio to a particular station or turning on a music player with a particular song or album, turning on the lights in the dining room, turning off the lights in the living room, etc. The user's words may be picked up by a microphone nearby in the room (and, more generally, by an acoustic transducer in the environment). One or more packets with this acoustic information may be communicated to an automation server.

After receiving the one or more packets, the automation server may transform the verbal request (operation 512), such as the natural language, into one or more desired operations. For example, the automation server may perform a speech-recognition technique on the acoustic information to generate a corresponding string of alphanumerical, such as the text or phrase 'let's get ready for dinner time.' Then, the automation server may perform semantic analysis on the phrase to interpret it as 'prepare the home for dinner time' and, more generally, to determine the user intent (operation 514). Similarly, using semantic analysis, the automation server may interpret 'I'm cold' as 'increase the room temperature', 'I'm hot' as 'decrease the room temperature', 'I'm scared' as 'turn on the lights in and around the house' and/or 'call the police', 'I'm hurt' as 'call for help', etc.

Based on prior experience (such as a predetermined supervised learning model that relates the desired operations and the electronic devices), stored information or metadata about the electronic devices (such as their functions, locations, etc.), a location of the microphone that recorded the user's words (which may have been included in the one or more packets) and/or a location of the user (which may be determined using triangulation and/or trilateration using multiple microphones, stored predefined acoustic characteristics of the environment, such as an acoustic delay as a function of position, an acoustic transfer function, etc.), the automation server may identify a subset (operation 516) of the electronic devices. For example, the phrase 'dinner time' may be used as an input into the supervised learning model, which is used to calculate probabilities for the electronic devices, such as a probability of 0.98 for the lights in the dining room, a probability of 0.95 for the television, a probability of 0.9 for a power supply, a probability of 0.9 for the radio, a probability of 0.85 for the lights in the living room, a probability of 0.75 for an appliance in the kitchen, etc., and the subset may have probabilities greater than 0.8 (i.e., the lights in the dining room, the television, the power supply, the radio, and the lights in the living room). More generally, the supervised learning model may be used to identify a subset of the electronic devices that have the ability to affect or achieve a desired outcome or result. Thus, the supervised learning model may provide an experience engine that maps user intent to subsets of the electronic devices.

Note that there may be more than one type of supervised learning model (such as different supervised learning models for different groups of types of electronic devices, different locations, etc.). In some embodiments, the supervised learning model is a based on at least one of: a classification and regression tree, a support vector machine, a neural network, logistic regression, linear regression, LASSO, and/or another (linear or nonlinear) regression technique. Moreover, the supervised learning model(s) may have been trained based on a stored dataset that includes a history of multiple previous user requests to perform one or more desired operations and the associated subsets of the electronic devices uses to perform the one or more desired operations.

Alternatively, if none of the probabilities output by the supervised learning model exceeded the threshold value, the automation server may identify the subset of the electronic devices based on their proximity to the location of the acoustic transducer and/or the user. For example, the subset of the electronic devices may include electronic devices located within 1-5 m of the user.

Then, the automation server may determine a set of commands based on the one or more desired operations and the subset of the electronic devices. In particular, determining the set of commands may convert the one or more desired operations into a command terminology of the subset of the electronic devices, such as by converting the one or more desired operations into available commands (operation 518) of the subset of the electronic devices. For example, the history of multiple previous user requests to perform one or more desired operations may include associated commands. Thus, 'prepare the room for dinner time' and the identified subset of the electronic devices may include commands such as: 'turn on' the lights in the dining room, 'turn off' the television, 'turn on' the power supply, 'turn on' the radio, 'play' a particular station, song or album, 'turn off' the lights in the living room, etc. In some embodiments, the automation server determines an order of the set of commands based on the subset of the electronic devices, such as turning on the power supply before turning on the radio (which is plugged into and, thus, receives power from, the power supply). Similarly, for 'increase the room temperature', the automation server may determine to increase the thermostat set point by 2 F; for 'decrease the room temperature', the automation server may determine to decrease the thermostat set point by 2 F; for 'turn on the lights in and around the house' and/or 'call the police', the automation server may turn various lights on for 20 min and/or may dial 911; and for "call for help", the automation server may dial 911 and/or may call a stored predefined telephone number of a friend, relative or neighbor that is specified in the one or more tags for a telephone or a telephone application.

After identifying the subset of the electronic devices and determining the set of commands, the automation server may provide the set of commands to the subset of the electronic devices, which then perform the desired operations.

In some embodiments, the automation server requests and receives feedback from the user about the subset of the electronic devices and/or the set of commands. For example, the automation server may request feedback when none of the probabilities calculated using the supervised learning model exceeds the threshold value. Note that the feedback may include at least one of: approval of the subset of the electronic devices or the set of commands, disapproval or rejection of at least one electronic device in the subset of the electronic devices or at least one command in the set of commands, or a modification of at least one electronic device in the subset of the electronic devices or at least one command in the set of commands. Moreover, the feedback may be used to update one or more of the identified electronic devices in the subset of the electronic devices and/or one or more of the determined commands in the set of commands. Moreover, the feedback may be used to revise the dataset used to train the supervised learning model(s). Consequently, the automation server may update or retrain one or more supervised learning models based on the feedback. Therefore, the automation technique may be continuously, periodically or intermittently (e.g., as needed) updated to improve its accuracy over time.

Note that the use of a probabilistic approach in the automation technique may provide a flexible or dynamic capability, which may allow the automation server to adapt to the presence of new electronic devices and/or different desired operations than those that have been explicitly encountered previously.

The automation technique may be used with an arbitrary type of data or information. For example, the automation technique may be used with home-automation data, audio/video data, computer data, environmental monitoring data, etc. In these embodiments, the automation technique may facilitate communication among and control of a wide variety of electronic devices. Thus, the automation technique may be used to facilitate or implement services in the so-called Internet of things.

We now describe embodiments of an electronic device. FIG. 6 presents a block diagram illustrating an electronic device 600, such as optional portable electronic device 108, one of electronic devices 110, optional access point 112, and/or automation server 118 in FIG. 1. This electronic device includes processing subsystem 610, memory subsystem 612, networking subsystem 614 and optional input/output (I/O) subsystem 634. Processing subsystem 610 includes one or more devices configured to perform computational operations. For example, processing subsystem 610 can include one or more microprocessors, application-specific integrated circuits (ASICs), microcontrollers, programmable-logic devices, and/or one or more digital signal processors (DSPs). One or more of these components in processing subsystem are sometimes referred to as a 'control mechanism' or a 'control circuit.'

Memory subsystem 612 includes one or more devices for storing data and/or instructions for processing subsystem 610 and networking subsystem 614. For example, memory subsystem 612 can include dynamic random access memory (DRAM), static random access memory (SRAM), and/or other types of memory. In some embodiments, instructions for processing subsystem 610 in memory subsystem 612 include: one or more program modules or sets of instructions (such as program module 622 or operating system 624), which may be executed by processing subsystem 610. Note that the one or more computer programs may constitute a computer-program mechanism. Moreover, instructions in the various modules in memory subsystem 612 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 610.

In addition, memory subsystem 612 can include mechanisms for controlling access to the memory. In some embodiments, memory subsystem 612 includes a memory hierarchy that comprises one or more caches coupled to a memory in electronic device 600. In some of these embodiments, one or more of the caches is located in processing subsystem 610.

In some embodiments, memory subsystem 612 is coupled to one or more high-capacity mass-storage devices (not shown). For example, memory subsystem 612 can be coupled to a magnetic or optical drive, a solid-state drive, or another type of mass-storage device. In these embodiments, memory subsystem 612 can be used by electronic device 600 as fast-access storage for often-used data, while the mass-storage device is used to store less frequently used data.

Networking subsystem 614 includes one or more devices configured to couple to and communicate on a wired and/or wireless network (i.e., to perform network operations), including: control logic 616, interface circuits 618 and associated antennas 620. (While FIG. 6 includes antennas 620, in some embodiments electronic device 600 includes one or more nodes, such as nodes 608, e.g., pads, which can be coupled to antennas 620. Thus, electronic device 600 may or may not include antennas 620.) For example, networking subsystem 614 can include a Bluetooth networking system (such as Bluetooth low energy), a cellular networking system (e.g., a 3G/4G network such as UMTS, LTE, etc.), a universal serial bus (USB) networking system, a networking system based on the standards described in IEEE 802.11 (e.g., a Wi-Fi networking system), an Ethernet networking system, and/or another networking system. Note that the combination of a given one of interface circuits 618 and at least one of antennas 620 may constitute a radio. In some embodiments, networking subsystem 614 includes a wired interface, such as wired interface 630.

Networking subsystem 614 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' between the electronic devices does not yet exist. Therefore, electronic device 600 may use the mechanisms in networking subsystem 614 for performing simple wireless communication between the electronic devices, e.g., transmitting advertising or beacon frames and/or scanning for advertising frames transmitted by other electronic devices as described previously.

Within electronic device 600, processing subsystem 610, memory subsystem 612, networking subsystem 614 and optional I/O subsystem 634 are coupled together using bus 628. Bus 628 may include an electrical, optical, and/or electro-optical connection that the subsystems can use to communicate commands and data among one another. Although only one bus 628 is shown for clarity, different embodiments can include a different number or configuration of electrical, optical, and/or electro-optical connections among the subsystems.

In some embodiments, electronic device 600 includes a display subsystem 626 for displaying information on a display (such as a request to clarify an identified environment), which may include a display driver, an I/O controller and the display. Note that a wide variety of display types may be used in display subsystem 626, including: a two-dimensional display, a three-dimensional display (such as a holographic display or a volumetric display), a head-mounted display, a retinal-image projector, a heads-up display, a cathode ray tube, a liquid-crystal display, a projection display, an electroluminescent display, a display based on electronic paper, a thin-film transistor display, a high-performance addressing display, an organic light-emitting diode display, a surface-conduction electronic-emitter display, a laser display, a carbon-nanotube display, a quantum-dot display, an interferometric modulator display, a multi-touch touchscreen (which is sometimes referred to as a touch-sensitive display), and/or a display based on another type of display technology or physical phenomenon.

Furthermore, optional I/O subsystem 634 may include one or more acoustic transducers (such as one or more microphones that measure or acquire acoustic signals), a physical user interface (such as a keyboard) or a user-interface controller that, in conjunction with display subsystem 626 presents or provides a virtual user interface.

Electronic device 600 can be (or can be included in) any electronic device with at least one network interface. For example, electronic device 600 can be (or can be included in): a desktop computer, a laptop computer, a subnotebook/netbook, a server, a tablet computer, a smartphone, a cellular telephone, a smartwatch, a consumer-electronic device (such as a television, a set-top box, audio equipment, video equipment, etc.), a remote control, a portable computing device, an appliance (such as a refrigerator, a toaster, an oven, a microwave oven), electric-power equipment, an environmental conditioner (such as heat, air conditioning, a fan, an air filter, etc.), an environmental-monitoring device, an environmental regulator (such as a thermostat), an alarm system (such as a smoke alarm, a fire alarm, a burglar alarm, etc.), an infrastructure system (such as water, gas, sewage, garbage, vacuum, air, etc.), an access point, a router, a switch, communication equipment, test equipment, and/or another electronic device.

Although specific components are used to describe electronic device 600, in alternative embodiments, different components and/or subsystems may be present in electronic device 600. For example, electronic device 600 may include one or more additional processing subsystems, memory subsystems, networking subsystems, and/or display subsystems. Moreover, while one of antennas 620 is shown coupled to a given one of interface circuits 618, there may be multiple antennas coupled to the given one of interface circuits 618. Additionally, one or more of the subsystems may not be present in electronic device 600. Furthermore, in some embodiments, electronic device 600 may include one or more additional subsystems that are not shown in FIG. 6. Also, although separate subsystems are shown in FIG. 6, in some embodiments, some or all of a given subsystem or component can be integrated into one or more of the other subsystems or component(s) in electronic device 600. For example, in some embodiments program module 622 is included in operating system 624.

Moreover, the circuits and components in electronic device 600 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit may implement some or all of the functionality of networking subsystem 614, such as one or more radios. Moreover, the integrated circuit may include hardware and/or software mechanisms that are used for transmitting wireless signals from electronic device 600 and receiving signals at electronic device 600 from other electronic devices. Aside from the mechanisms herein described, radios are generally known in the art and hence are not described in detail. In general, networking subsystem 614 and/or the integrated circuit can include any number of radios.

In some embodiments, networking subsystem 614 and/or the integrated circuit include a configuration mechanism (such as one or more hardware and/or software mechanisms) that configures the radios to transmit and/or receive on a given channel (e.g., a given carrier frequency). For example, in some embodiments, the configuration mechanism can be used to switch the radio from monitoring and/or transmitting on a given channel to monitoring and/or transmitting on a different channel. (Note that 'monitoring' as used herein comprises receiving signals from other electronic devices and possibly performing one or more processing operations on the received signals, e.g., determining if the received signal comprises an advertising frame, calculating a performance metric, performing spectral analysis, etc.) Furthermore, networking subsystem 614 may include at least one port (such as a wired port 632 or a wired connector) to receive and/or provide information.

While a communication protocol compatible with Wi-Fi was used as an illustrative example, the described embodiments may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the automation technique may be implemented using program module 622, operating system 624 (such as drivers for interface circuits 618) and/or in firmware in interface circuits 618. Alternatively or additionally, at least some of the operations in the automation technique may be implemented in a physical layer, such as hardware in interface circuits 818.

Moreover, while the preceding embodiments included a touch-sensitive display in the portable electronic device that the user touches (e.g., with a finger or digit, or a stylus), in other embodiments the user interface is display on a display in the portable electronic device and the user interacts with the user interface without making contact or touching the surface of the display. For example, the user's interact(s) with the user interface may be determined using time-of-flight measurements, motion sensing (such as a Doppler measurement) or another non-contact measurement that allows the position, direction of motion and/or speed of the user's finger or digit (or a stylus) relative to position(s) of one or more virtual command icons to be determined. In these embodiments, note that the user may activate a given virtual command icon by performing a gesture (such as 'tapping' their finger in the air without making contact with the surface of the display). In some embodiments, the user navigates through the user interface and/or activates/deactivates functions of one of the components in system 100 (FIG. 1) using spoken commands or instructions (i.e., via speech recognition) and/or based on where they are looking at on a display in portable electronic device 110 or on one of electronic devices 110 in FIG. 1 (e.g., by tracking the user's gaze or where the user is looking).

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A computer system, comprising:
   an interface circuit;
   a processor electrically coupled to the interface circuit;
   memory, coupled to the processor, which stores a program module, wherein, when executed by the processor, the program module causes the computer system to perform one or more operations comprising:
      receiving, via the interface circuit, information, associated with an acoustic transducer in an environment and a portable electronic device, specifying the one or more desired operations that are to be performed, wherein the information includes natural language describing the one or more desired operations;
      transforming the natural language into the one or more desired operations, wherein the transforming involves performing semantic analysis on the information to determine an intent of an individual;
      identifying a subset of electronic devices based on the one or more desired operations and a predetermined supervised learning model that relates desired operations and electronic devices, wherein the subset of the electronic devices is identified based on one of: at least a probability, calculated using the predetermined supervised learning model, which is associated with the subset of the electronic devices; and a proximity of the subset of the electronic devices to the acoustic transducer;
      determining a set of commands based on the one or more desired operations and the subset of the electronic devices, wherein the set of commands comprise multiple commands;
      determining an order of the set of commands based on the subset of the electronic devices, information that specifies a predefined hierarchical arrangement of the subset of the electronic devices and a dependence of the set of commands in the hierarchy, wherein the predefined hierarchical arrangement corresponds to interconnections and functional interrelationships of the subset of the electronic devices; and
      providing, via the interface circuit, the set of commands for the identified subset of the electronic devices, wherein the set of commands instruct the subset of the electronic devices to perform the one or more desired operations.

2. The computer system of claim 1, wherein the information corresponds to verbal information associated with the acoustic transducer.

3. The computer system of claim 1, wherein the information includes text associated with the portable electronic device.

4. The computer system of claim 1, wherein the determining the set of commands involves converting the one or more desired operations into a command terminology of one or more of the electronic devices.

5. The computer system of claim 1, wherein the subset of the electronic devices includes a power source and a separate electronic device that receives power from the power source; and
   wherein a command that activates the power source is performed before a remainder of the set of commands.

6. The computer system of claim 1, wherein the one or more operations comprise:
   adding a second electronic device to the electronic devices;
   determining one or more tags associated with the second electronic device, wherein the one or more tags include: metadata for the second electronic device, a type of the second electronic device, and available commands for the second electronic device; and
   receiving, via the interface circuit, feedback associated with the portable electronic device.

7. The computer system of claim 6, wherein the one or more operations comprise revising the supervised learning model based on the feedback.

8. The computer system of claim 6, wherein the one or more operations comprise:
   adding the second electronic device; and
   determining the one or more tags occur automatically when the second electronic device is identified in the environment by the computer system based on one or more packets, associated with the second electronic device, which are received by the interface circuit.

9. The computer system of claim 6, wherein the feedback includes one of: an action of the individual; and a behavior of the individual.

10. The computer system of claim 6, wherein the one or more operations comprise:
    providing, via the interface circuit and prior to receiving the feedback, at least a command in the set of commands for the portable electronic device that is associated with the second electronic device; and
    conditionally modify the set of commands based on the feedback prior to providing the set of commands to the identified subset of the electronic devices.

11. The computer system of claim 10, wherein the feedback includes one of: approval of the set of commands; and modification of the set of commands.

12. The computer system of claim 6, wherein the determining the one or more tags involves accessing predefined information associated with the second electronic device that is stored in the memory, including available commands associated with the second electronic device.

13. The computer system of claim 6, wherein the one or more operations comprise determining groupings of the electronic devices based on the one or more tags.

14. The computer system of claim 6, wherein the one or more operations comprise determining a hierarchy of the electronic devices based on the one or more tags.

15. The computer system of claim 1, wherein the set of commands are determined based on available commands for the subset of the electronic devices.

16. The computer system of claim 15, wherein the available commands for a given electronic device include pairs of commands that result in opposite operations by the given electronic device.

17. A non-transitory computer-readable storage medium for use in conjunction with a computer system, the computer-readable storage medium storing a program module that, when executed by the computer system, causes the computer system to perform one or more desired operations by performing one or more operations comprising:
receiving, via an interface circuit in the computer system, information, associated with one of an acoustic transducer in an environment and a portable electronic device, specifying the one or more desired operations that are to be performed, wherein the information includes natural language describing the one or more desired operations;
transforming the natural language into the one or more desired operations, wherein the transforming involves performing semantic analysis on the information to determine an intent of an individual;
identifying a subset of electronic devices based on the one or more desired operations and a predetermined supervised learning model that relates desired operations and electronic devices, wherein the subset of the electronic devices is identified based on one of: at least a probability, calculated using the predetermined supervised learning model, which is associated with the subset of the electronic devices; and a proximity of the subset of the electronic devices to the acoustic transducer;
determining a set of commands based on the one or more desired operations and the subset of the electronic devices, wherein the set of commands comprise multiple commands;
determining an order of the set of commands based on the subset of the electronic devices, information that specifies a predefined hierarchical arrangement of the subset of the electronic devices and a dependence of the set of commands in the hierarchy, wherein the predefined hierarchical arrangement corresponds to interconnections and functional interrelationships of the subset of the electronic devices; and
providing, via the interface circuit, the set of commands for the identified subset of the electronic devices, wherein the set of commands instruct the subset of the electronic devices to perform the one or more desired operations.

18. The non-transitory computer-readable storage medium of claim 17, wherein the one or more operations comprise:
adding a second electronic device to the electronic devices;
determining one or more tags associated with the second electronic device, wherein the one or more tags include: metadata for the second electronic device, a type of the second electronic device, and available commands for the second electronic device; and
receiving, via the interface circuit, feedback associated with the portable electronic device.

19. A method for performing one or more desired operations, the method comprising:
by a computer system:
receiving, via an interface circuit in the computer system, information, associated with one of an acoustic transducer in an environment and a portable electronic device, specifying the one or more desired operations that are to be performed, wherein the information includes natural language describing the one or more desired operations;
transforming the natural language into the one or more desired operations, wherein the transforming involves performing semantic analysis on the information to determine an intent of an individual;
identifying a subset of the electronic devices based on the one or more desired operations and a predetermined supervised learning model that relates desired operations and electronic devices, wherein the subset of the electronic devices is identified based on one of: at least a probability, calculated using the predetermined supervised learning model, which is associated with the subset of the electronic devices; and a proximity of the subset of the electronic devices to the acoustic transducer;
determining a set of commands based on the one or more desired operations and the subset of the electronic devices, wherein the set of commands comprise multiple commands;
determining an order of the set of commands based on the subset of the electronic devices, information that specifies a predefined hierarchical arrangement of the subset of the electronic devices and a dependence of the set of commands in the hierarchy, wherein the predefined hierarchical arrangement corresponds to interconnections and functional interrelationships of the subset of the electronic devices; and
providing, via the interface circuit, the set of commands for the identified subset of the electronic devices, wherein the set of commands instruct the subset of the electronic devices to perform the one or more desired operations.

20. The method of claim 19, wherein the method comprises:
adding a second electronic device to the electronic devices;
determining one or more tags associated with the second electronic device, wherein the one or more tags include: metadata for the second electronic device, a type of the second electronic device, and available commands for the second electronic device; and
receiving, via the interface circuit, feedback associated with the portable electronic device.

* * * * *